United States Patent
Isaksson et al.

(10) Patent No.: US 8,220,580 B2
(45) Date of Patent: Jul. 17, 2012

(54) IMPACT GUARD BEAM

(75) Inventors: Kenneth Isaksson, Boden (SE); Hans Bodin, Sodra Sundarbyn (SE)

(73) Assignee: Gestamp Hardtech AB, Lulea (SE)

( * ) Notice: Subject to any disclaimer, the term of this patent is extended or adjusted under 35 U.S.C. 154(b) by 39 days.

(21) Appl. No.: 12/736,563

(22) PCT Filed: Apr. 20, 2009

(86) PCT No.: PCT/SE2009/000199
§ 371 (c)(1),
(2), (4) Date: Oct. 19, 2010

(87) PCT Pub. No.: WO2009/131513
PCT Pub. Date: Oct. 29, 2009

(65) Prior Publication Data
US 2011/0031724 A1 Feb. 10, 2011

(30) Foreign Application Priority Data
Apr. 24, 2008 (SE) .................................... 0800938-3

(51) Int. Cl.
*B60R 19/02* (2006.01)
*B60R 19/18* (2006.01)
(52) U.S. Cl. .................... 180/274; 180/271; 296/187.03; 296/187.12
(58) Field of Classification Search .................. 180/271, 180/274; 280/748, 751; 296/146.6, 187.03, 296/187.09, 187.11, 187.12
See application file for complete search history.

(56) References Cited

U.S. PATENT DOCUMENTS

| | | | | |
|---|---|---|---|---|
| 4,684,166 | A | * | 8/1987 | Kanodia ..................... 296/146.6 |
| 4,796,946 | A | | 1/1989 | Wilson et al. |
| 5,039,160 | A | * | 8/1991 | Garnweidner et al. .. 296/187.12 |
| 5,924,765 | A | * | 7/1999 | Lee ................................. 296/209 |
| 6,179,355 | B1 | * | 1/2001 | Chou et al. ..................... 293/132 |
| 6,554,345 | B2 | * | 4/2003 | Jonsson ..................... 296/146.6 |
| 6,726,261 | B2 | * | 4/2004 | Goto et al. ..................... 293/120 |
| 7,407,219 | B2 | * | 8/2008 | Glasgow et al. .......... 296/187.03 |
| 7,854,453 | B2 | * | 12/2010 | Tanabe .......................... 293/102 |
| 7,938,463 | B2 | * | 5/2011 | Lee ................................. 293/120 |
| 8,061,762 | B2 | * | 11/2011 | Arvidsson et al. .......... 296/146.6 |
| 2002/0069609 | A1 | * | 6/2002 | Nees et al. .................... 52/735.1 |

FOREIGN PATENT DOCUMENTS

| | | |
|---|---|---|
| EP | 985569 A2 * | 3/2000 |
| WO | WO 95/20506 A1 | 8/1995 |
| WO | WO 99/20490 A1 | 4/1999 |
| WO | WO 02/04240 A1 | 1/2002 |
| WO | WO 2006/012223 A2 | 2/2006 |
| WO | WO 2008/033066 A1 | 3/2008 |

* cited by examiner

*Primary Examiner* — Joseph Rocca
*Assistant Examiner* — James English
(74) *Attorney, Agent, or Firm* — Mark P. Stone

(57) ABSTRACT

An impact guard beam for vehicles comprises a beam (11) with a hat profile, i.e., with a crown (13-15) and side flanges (16-17), and the hat profile has its crown facing outwards. The beam has a cover (20) giving at least a central part of the beam a closed cross section. The cover has a profile allowing it to lengthen by straightening out when the hat beam's profile opens under impact loads, but stops the hat beam profile's opening when the cover is straightened out. The cover may carry a sensor (24) for an airbag, which is then placed inside the beam profile.

12 Claims, 3 Drawing Sheets

12

IMPACT GUARD BEAM

FIELD OF THE INVENTION

The invention concerns an impact guard beam for vehicles, comprising a beam with a hat profile, i.e., with a crown and side flanges, wherein the hat profile has its crown facing outwards and has a connecting element giving at least a central part of the beam a closed cross section.

BACKGROUND OF THE INVENTION

Such impact guard beams are used as side impact protection in vehicle doors and as bumper beams. The connecting element can be a short cover or a cover along the entire beam. Without the cover, the beam tends to flatten out when its crown is subjected to impact forces, so that the beam's bending resistance quickly decreases. If the beam has a planar cover, it maintains its profile, resulting in large stresses in the flanges and the cover and increased risk of cracks. Such a beam tends to buckle in the middle.

PURPOSE OF THE INVENTION AND BRIEF DESCRIPTION THEREOF

One object of the invention is to improve the energy uptake for a hat beam of the above kind. This is fulfilled when the connecting element has a profile allowing it to lengthen by straightening out when the hat beam's profile opens under impact loads, yet counteracting the hat beam's further opening when the connecting element is straightened out.

The invention is defined by the claims.

DETAILED DESCRIPTION OF THE DEPICTED AND PREFERRED EXAMPLE OF THE INVENTION

Figure 1:
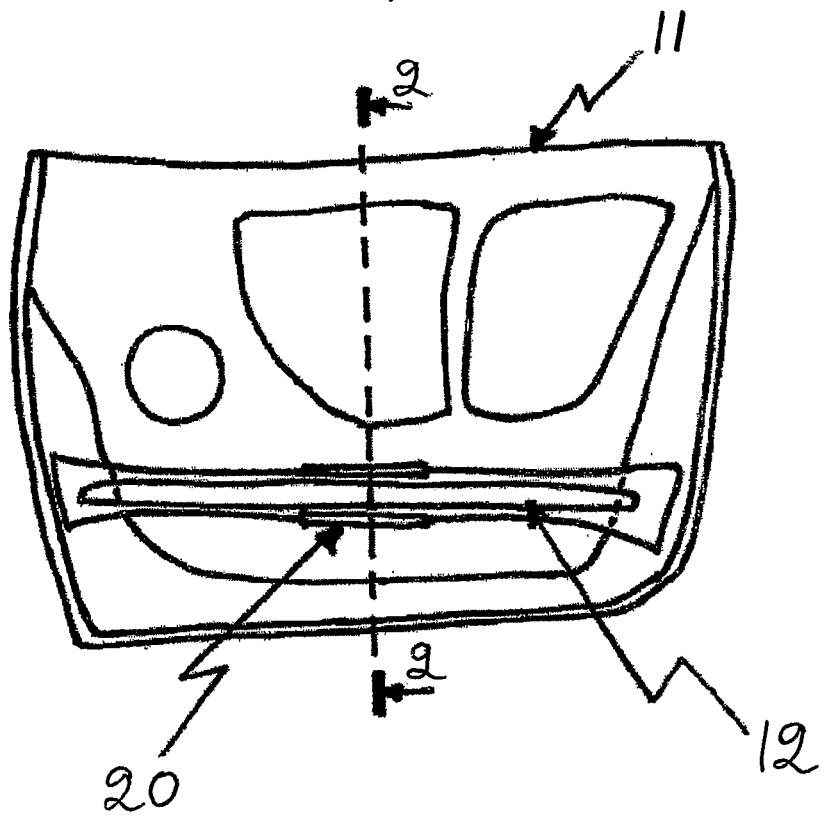
FIG. 1 is a side view of a vehicle door without outer panel, seen from the outside.
Figure 2:
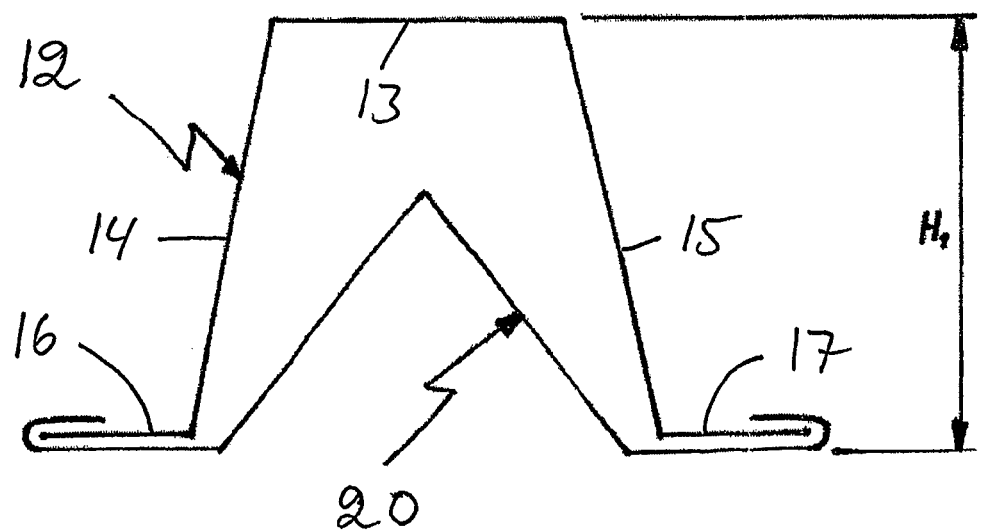
FIG. 2 is a cross section along line 2-2 in FIG. 1 through the central part of an impact guard beam per FIG. 1.
Figure 3:
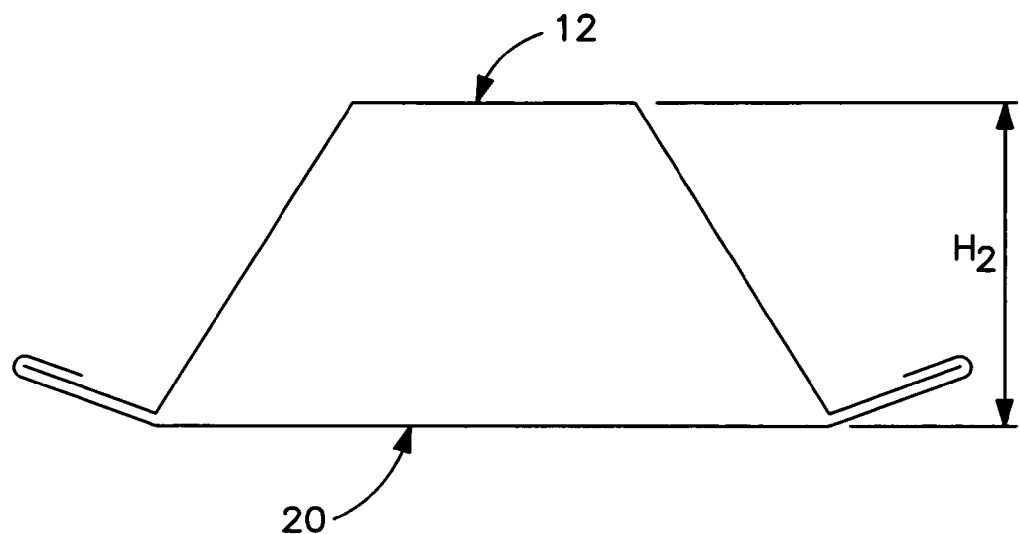
FIG. 3 shows the same cross section after the beam has been exposed to impact load.

FIG. 1 shows schematically a vehicle door from the outside. It has a supporting inner panel 11, and an impact guard beam 12 of metal, preferably steel, is connected between its ends. The door is shown without its outer panel. The beam 12 has a hat beam profile, as appears from FIG. 2, i.e., it has a central flange 13, two webs 14,15 and two side flanges 16,17. The central flange and the two webs form the crown of the hat beam 13-15, which can be more rounded than shown. The central part of the hat beam has a connecting element in the form of a cover 20 fastened to the side flanges 16,17 by being folded around the flanges, as shown, and possibly also welded or glued to the two flanges or otherwise secured. The cover 20 has a profile longer than the hat beam's opening, being bent into the hat beam. It can have an appearance as shown in FIG. 2, for example.

When the hat beam is subjected to a collision load on its central flange 13, the beam gives way by opening until its cover 20 straightens out and becomes planar. The profile height of the hat beam then diminishes from height H1 in FIG. 1 to height H2 in FIG. 2. The cover presents only slight resistance during this straightening, but when the cover has become planar it presents great resistance through its yield strength and tensile strength and it counteracts further opening of the beam profile. The length and cross section of the cover are adapted so that the cover will normally not break, but rather the hat beam and the cover will be plastically deformed after the cover becomes flat, thereby giving the greatest possible energy uptake. The length of the cover along the beam should be at least 10 cm when it is a single cover, but the cover can cover a major portion of the beam length. The cover can be divided in a number of narrow connecting elements placed at a distance from each other over a larger portion of the beam length in order to provide a more uniform deformation regardless of the positioning of the impact load, without the need for a long cover.

Figure 4:
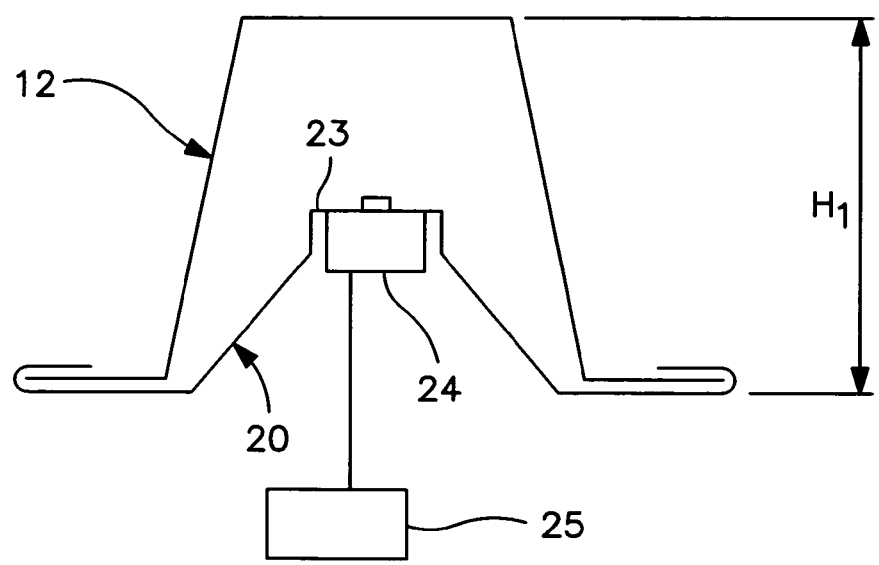
FIG. 4 shows an alternative embodiment of the impact guard beam designed to bear a sensor for an airbag.

FIG. 4 shows an alternative design of cover 20. It has a flat part 23 designed to carry a sensor 24 to initiate an airbag 25. In this way, the sensor is placed inside the hat beam at the middle of its cross section and it will have less risk of sending a false signal, being less exposed to acceleration, e.g., when the door is shut hard, than if it were positioned on a side flange.

Figure 5:
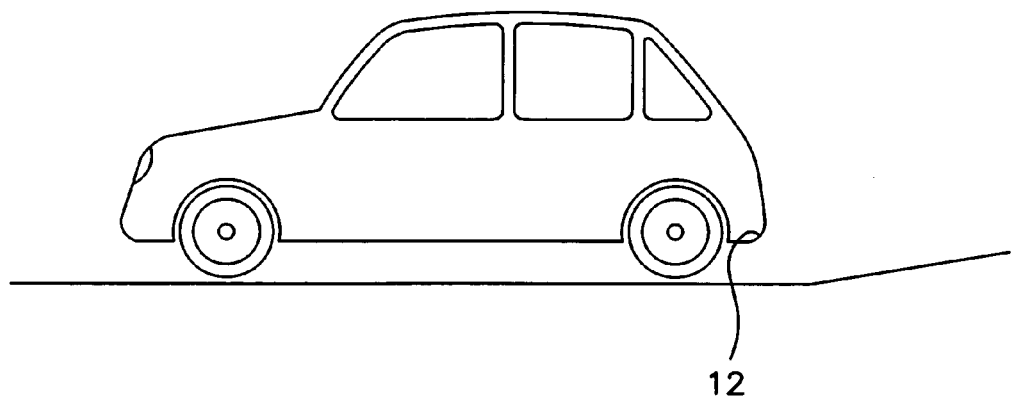
FIG. 5 shows the impact guard as a bumper beam for a vehicle.

The invention is exemplified with an impact guard beam for a vehicle door, but the invention can be used for other impact protection, e.g., bumper beams, as illustrated by FIG. 5.

The invention claimed is:

1. Impact guard beam for vehicles, comprising a beam (12) with a hat profile, said hat profile formed from a crown portion having a central flange (13) and two webs (14, 15) extending from the central flange, and two side flanges (16-17) extending respectively from said two webs, wherein the hat profile has said crown portion facing outwards and has a connecting element (20) extending across an opening defined between the two webs of the crown portion for providing at least a central part of the beam with a closed cross section,
   wherein
   the connecting element (20) has a profile allowing said connecting element to lengthen by straightening out when the width of the hat profile (13-17) expands under impact loads, said connecting element counteracting further expansion of said hat profile when said connecting element has been straightened out.

2. Impact guard beam according to claim 1, wherein the connecting element (20) is bent into the beam.

3. Impact guard beam according to claim 1, wherein the connecting element is a cover (20) that covers at least 10 cm of the impact guard beam's length.

4. Impact guard beam according to claim 1, wherein the beam constitutes a side collision protection in a vehicle door.

5. Impact guard beam according to claim 3, wherein the connecting element (20) is bent into the beam and carries a sensor (24) to initiate an airbag.

6. Impact guard beam according to claim 1, wherein said impact guard beam is a bumper beam for a vehicle.

7. Impact guard beam according to claim 2, wherein the connecting element is a cover (20) that covers at least 10 cm of the impact guard beam's length.

8. Impact guard beam according to claim 2, wherein the beam constitutes a side collision protection in a vehicle door.

9. Impact guard beam according to claim 3, wherein the beam constitutes a side collision protection in a vehicle door.

10. Impact guard beam according to claim 7, wherein the beam constitutes a side collision protection in a vehicle door.

11. Impact guard beam according to claim 7, wherein the connecting element (20) is bent into the beam and carries a sensor (24) to initiate an airbag.

12. Impact guard beam according to claim 2, wherein said impact guard beam is a bumper beam for a vehicle.

* * * * *